June 12, 1945.  R. PASH  2,378,033
MECHANICAL MOTION
Filed Dec. 22, 1942  2 Sheets-Sheet 1

INVENTOR
R. PASH
BY
ATTORNEY

June 12, 1945.  R. PASH  2,378,033
MECHANICAL MOTION
Filed Dec. 22, 1942  2 Sheets-Sheet 2
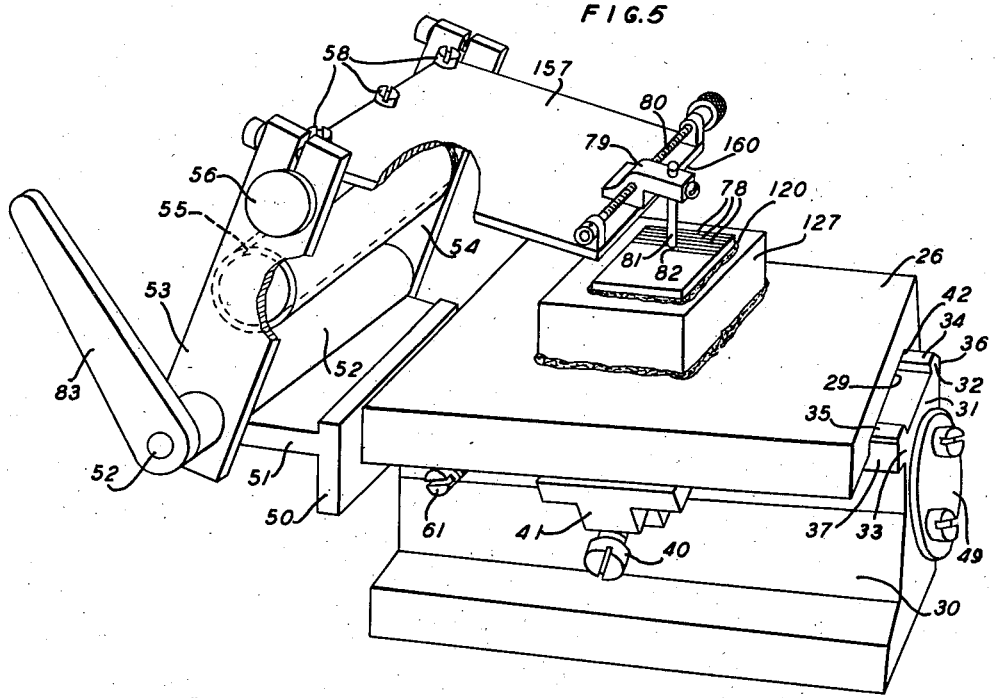
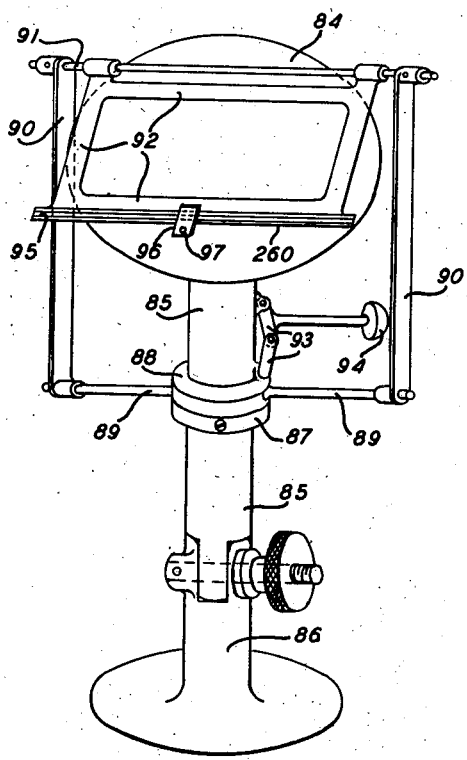
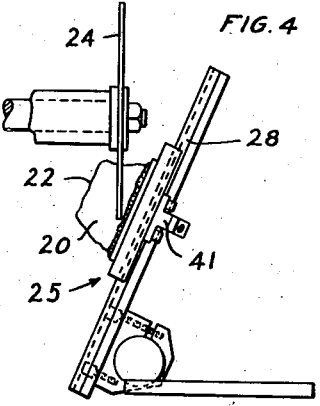
INVENTOR
R. PASH
BY
ATTORNEY Patented June 12, 1945

2,378,033

UNITED STATES PATENT OFFICE 2,378,033

MECHANICAL MOTION

Robert Pash, Roselle, N. J., assignor to Western Electric Company, Incorporated, New York, N. Y., a corporation of New York Application December 22, 1942, Serial No. 469,795

2 Claims. (Cl. 33—108)

This invention relates to a mechanical motion, and more particularly to a mechanical linkage for converting rotary motion into rectiplanar motion, that is to use rotary motion only to confine a point or member to be free to move only in one flat plane, or to confine a line or member to be free to move only so that it always remains parallel to itself.

There are many instances in various arts in which it is desirably useful to have a member with two degrees of freedom of motion but so constrained that any given point of the member is confined to move in a plane perpendicular to a specific axis or direction. Any linear element of the member in question which is parallel to the specific axis or direction, will then always remain parallel to itself, although it may have two degrees of freedom perpendicularly to itself. Many linkages and devices have been devised to effect such a combination of constraint and freedom of motion; but in most instances these depend in one way or another upon a pre-existing or pre-created rectiplanar surface as a guide for the motion, i. e., upon the flatness of some slide face or pivot face. It is difficult to keep such guide members clean in use; and it takes but little wear to render them faultily inaccurate. Furthermore, apart from the guide surface, such arrangements are usually two-dimensioned in structure and lack rigidity transversely to the plane of freedom of motion provided by the arrangement.

An object of the present invention is to provide, in a device employing a member confined to rectiplanar motion, a linkage to convert biaxial rotary motion into rectiplanar motion, which linkage is inherently rigid transversely to the plane of the motion and is not dependent upon any rectilinear or rectiplanar guide member for its operation.

With the above and other objects in view, the invention may be embodied in a device comprising a two-dimensionally extended rigid primary member pivotable about a fixed axis, a two-dimensionally extended rigid secondary member pivotably attached to the primary member on an axis parallel to the axis thereof, and an operative tool carried on a part of the secondary spaced from the axis thereof.

Other objects and features of the invention will appear from the following detailed description of several embodiments thereof taken in connection with the accompanying drawings, in which the same reference numerals are applied to identical parts in the several figures, and in which Fig. 1 is a perspective view of a device, embodying the invention, for orienting slices of quartz on a carrier bed for subsequent presentation to a saw;

Fig. 4 is a diagrammatic view of the oriented crystal on the bed as presented to a saw;

Fig. 5 is a perspective view of a device, embodying the invention, and particularly adapted to the making of a diffraction spectrum grating; and Fig. 6 is a diagrammatic perspective view of a drafting device embodying the invention.

Figures 1, 2, 3:
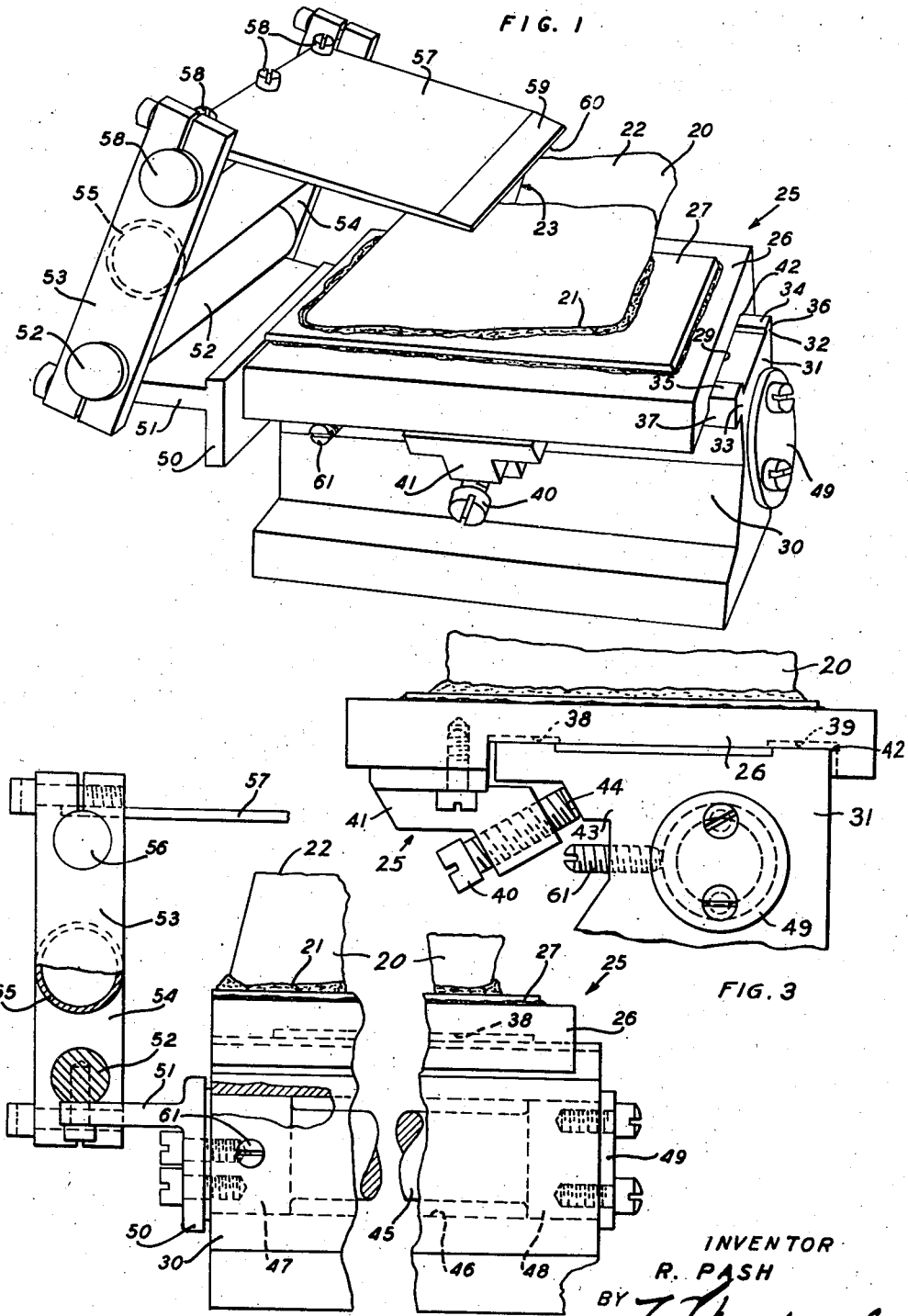
Fig. 2 is a broken view thereof in front elevation.
Fig. 3 is a partial end view thereof.

As disclosed in Figs. 1, 2, 3 and 4, the invention is disclosed in a device primarily adapted for orienting a slab of material on a supporting member in a particular position relatively thereto. In various electrical apparatus employing high frequency currents and potentials, e. g., in telephone and radio apparatus, use is made of slices or plates of crystalline quartz, cut preferably from a single crystal in such fashion that the plane of the saw used for the cutting shall be oriented in a specific, accurately predetermined relation to the optical axis and to one of the three electrical axes of the crystal. To this end, the optical axis may be first determined by means not relevant here and a slab 20 cut from the crystal with the face 21 accurately perpendicular to the optical axis and the face 22 roughly parallel to the face 21.

The three electrical axes of a quartz crystal are all perpendicular to the optical axis, i. e., are parallel to the plane 21, and are one hundred and twenty degrees (120°) from each other. Again by means not relevant here, the direction of one of these three electrical axes is discovered and the trace 23 of a plane containing this axis and parallel to the optical axis is marked on the face 22 of the slab 20, e. g., by a pencil line.

The next problem, and the one with which this particular embodiment of the invention is concerned, is to so orient the slab 20 on a suitable holder that, when the holder is placed in the sawing apparatus to which it appertains, the slab 20 will be presented to the saw 24 with the plane 21 and the direction 23 at accurately predetermined angular relations to the plane of the saw. The slab holder, generally indicated at 25, comprises a flat, rigid base 26, preferably of metal having a plane upper surface to which is rigidly cemented a face plate 27, preferably of glass, ceramic substance, or the like having an accurately plane upper surface. The slab holder is to be interchangeably mountable upon an angularly adjustable support 28 and upon the device of the invention, and for this purpose is formed with a broad slot or guideway 29 on its underface, of generally rectangular cross-section, whose inside roof surface is parallel to the outside roof face and so to the surface 27.

The device of the invention has a heavy, rigid base member 30, formed on its upper face with a generally horizontal guide 31 to be received in the guideway 29 of the slab holder. The guide 31 presents a pair of parallel rails 32 and 33 having accurately plane upper faces 34 and 35 and side faces 36 and 37 which are respectively horizontal and vertical. The width from face 36 to face 37 is triflingly less than the width of the guideway 29 of the slab holder. The surface of the guideway 29 is cut away by slots 38 and 39 so that the holder base 25 rests on the rails 32 and 33 only at four relatively limited areas at the four corners of the guideway 29.

A locking screw 40 is mounted in a bracket 41 on the under face of the front wall of the guideway 29 with its axis in a plane transverse to the direction of the rails 32 and 33, and with its axis slanting up and so directed and located as to intersect the general transverse roof surface of the guideway 29 at a considerable distance from the apex line 42 of the dihedral angle between the roof surface and the inner face of the far side wall of the guideway 29. The base member 30 is further formed with a shoulder 43 having a face 44 to be abutted by the inner end of the screw 40 and oriented transversely to the axis of the screw 40.

In consequence of the structures and relations just described, every time that the slab holder 25 is locked in place on the base 30 by the screw 40 the relative position of the slab holder on the base is identically the same. This is because the axial stress of the screw 40 on the shoulder 43 has both vertical and horizontal components within the slab holder base 26, which locks the base 26 securely down on the faces 34 and 35 of the rails 32 and 33, and also lock the base 26 securely sidewise against the face 36 of the rail 32. If the screw 40 were either horizontal or vertical, one of these locking directions would be missing; and if the axis of the screw 40 were oriented to intersect the line 42 or to pass close to that line, the effectiveness of the two-directional locking would be nullified or, at best, seriously impaired. Hence it is preferred to have the axis of the screw 40 intersect the roof of the guideway 29 at a considerable distance from the line 42 and at considerable angles to both the roof plane and the side wall plane of the guideway.

The sawing machine support 28 is formed to have along its upper side a cross-section identical in form and dimensions to that shown for the upper portion of the base 30. Thus when the slab support 25 is locked in place on the member 28 by the screw 40, it assumes the same position relatively thereto every time; and this position relative to the support 28 is identically the same as the position of the slab support relatively to the base 30 when locked thereon. This is a feature of importance, since, as hereinafter described, the slab 20 is oriented on the support 25 in the device of Figs. 1 and 2, to be transferred with the support 25 to the member 28 and there presented by the member 28 to the saw 24 in a precisely predetermined relation thereto. Hence the arrangement of the axis of the locking screw 40 to intersect the top of the support body 26 diagonally and at a considerable distance from the line 42 is believed to be a subsidiary invention clearly ancillary to the main invention as embodied in the device now being considered.

The slab 20 is cemented at its accurately plane face 21 on the plane top face of the glass plate 27, with soft but hardenable cement. For example, a shellac base cement which softens by gentle heating and hardens on cooling may be employed. The problem now is to bring the pencil line 23 on the upper face 22 of the slab 20 to lie in a vertical plane at right angles to the direction of the guideway 29.

A shaft 45 is mounted in a bore 46 in the base 30, beneath the rails 32 and 33 and accurately parallel to the direction of these rails and hence to the direction of the guideway 29 when the holder 25 is locked in place on the base 30. The bore 46 is cylindrical and the shaft 45 fits this bore closely but with freedom to rotate therein only at relatively short portions 47 and 48 near the ends of the shaft and bore, the portion of the shaft between these bearings 47 and 48 being of smaller diameter. The shaft 45 has the same length as the base 30 and is held in the bore 46 by a cap 49 and a crossbar 50 fastened to the ends of the shaft.

The crossbar 50 is formed with a horizontally outstanding longitudinal flange 51. Near the outer edge of the upper surface of the flange 51, a shaft 52 is rigidly secured by screws as indicated in Fig. 2. These parts are so made and related, that if the shaft 45 be rotated in the base 30, the shaft 52 is always in a plane perpendicular to the axis of the shaft 45 and also always perpendicular to the direction of the guideway 29 when the slab holder 25 is clamped on the rails 32 and 33 as described. Links 53 and 54 are pivoted on the ends of the shaft 52 to have no motion thereon except free rotation about the axis of the shaft 52. These links 53 and 54 are rigidly connected together at their mid points by a transverse antitorsion member 55, preferably a relatively large, hollow cylinder welded at each end to the links and holding them in rigidly parallel relation to each other. At the upper ends of the links 53 and 54, a shaft 56 is journalled in the links to have no motion relatively to the links except free rotation about an axis parallel to the axis of the shaft 52. A rectangular plate 57 is rigidly secured to the shaft 56 in parallelism to the axis of the shaft 56 by means of screws 58. The plate 57 is thick enough to be rigid against any torsional stresses of ordinary use. Its outer end may be bevelled, as at 59 and its outer edge 60 is made straight and parallel to the axis of the shaft 56. Then since the edge 60 is always parallel to the axis of the shaft 56 and this is always parallel to the axis of the shaft 52 which is always in a plane perpendicular to the direction of the rails 32 and 33 of the guideway 29, the edge 60 is necessarily always in a plane perpendicular to the direction of the guideway 29.

The elements 53, 54 and 55 form in effect a single rigid link pivotable about the shaft 52. The plate 57 is a link pivotable about the shaft 56, which is arcuately movable with the link 53, 54, 55 about the shaft 52. Thus the edge 60 has two degrees of freedom of motion but remains always parallel to itself and always perpendicular to the direction of the axis of the shaft 45 and to the direction of the guideway 29, these two directions being the same.

If the part of the upper face 22 of the crystal slab 20 on which is the pencil mark 23 is approximately parallel to the face 21 and hence to the surface of the plate 27, the edge 60 may be brought to rest approximately on this part of the surface 22 and across the line 23 at about its middle point, as illustrated in Fig. 1. The crystal slab 20 may then be turned in the soft cement holding it on the plate 27 (clockwise in the case illustrated) until the line 23 and the edge 60 substantially coincide. The crystal slab is then in the desired orientation on the slab holder 25 and the cement is hardened. The slab holder may then be removed from the device of Figs. 1, 2 and 3 and placed on the support 28 of Fig. 4 to be properly presented to the saw 24 in the desired relation thereto.

Because of the two degrees of freedom of motion of the edge 60, the device of Fig. 1 will be accurately operative with a considerable range of thickness of crystal slabs 20. The one illustrated is near the upper limit of thickness which can be accommodated in the device shown. But any thickness from this down to the least usable value can be dealt with.

Should the upper surface 22 be considerably out of parallel with the surface 21 of the crystal, the whole linkage may be rocked about the axis of the shaft 45 by loosening the jam screw 61 which holds this shaft adjustably stationary in the base 30. No matter how much or little this rocking may be, the edge 60 is always perpendicular to the direction of the axis of the shaft 45 and to the direction of the guideway 29. Thus the pencil mark 23 need only be on an approximately flat portion of the upper surface of the crystal slab, which portion may be tilted with respect to the face 21 by any amount within a large range and in any direction, and the device is still usable to orient the slab accurately on the slab holder.

This convenient and wide range of usefulness of the device depends primarily upon the dynamic geometry of the linkage connecting the edge 60 to the axis of the shaft 52. Reduced to its essential elements this linkage comprises a two-dimensionally extended rigid primary member or link (53, 54, 55) freely rotatable on a fixed axis (52), and a two-dimensionally extended rigid secondary member or link (57) mounted on the primary member or link to be freely rotatable with respect thereto on an axis (56) parallel to the fixed axis (52) and spaced therefrom. For the purposes of this application, the phrase "folding door linkage" will be defined to mean such a linkage. The primary axis is the fixed axis on which the primary member or link turns and the secondary axis is the axis fixed in the primary member or link but movable therewith on which the secondary member or link turns with respect to the primary member or link.

In Fig. 5, there is shown an embodiment of the invention in which a device substantially like that of Figs. 1 and 2 is modified to adapt it to another purpose. Where the usefulness of the device of Figs. 1 and 2 rests in the fact that the outer or free edge of the secondary link of a folding door linkage remains always parallel to the fixed axis of the primary link and therefore always parallel to itself regardless of its two degrees of freedom of motion, in the device of Fig. 5 the usefulness resides in the fact that any fixed point of or attached to the secondary link is confined in its doubly free motion to a fixed plane perpendicular to the fixed axis of the primary link, as well as in the fact that the outer edge of the secondary link is always parallel to itself.

The general structure of the device of Fig. 5 is the same as that of Figs. 1 and 2 and will not be described in detail here. The figure is wholly diagrammatic; minor refinements have been omitted in order to show the principles clearly. A cushion block 127 is rigidly cemented on the body 26 and on this is rigidly cemented a glass or crystal plate 120 upon which is to be scribed a Rowland grating such as is used in diffraction spectroscopes.

The problem here is to scratch or cut on the accurately plane upper surface of the plate 120 a series of accurately mutually parallel lines 78 so that the distance between any two neighboring lines of the series shall be accurately constant. For this purpose, the outer edge 160 of the secondary link 157 is made accurately parallel to the axes at 56 and 52; and a carriage 79 is mounted on the outer edge of the link 157 to be traversable by a micrometer screw 80. A generally vertical pin 81 is removably and adjustably mounted in the carriage to overhang and extend below the edge 160 when in place. A diamond scribing point 82 is mounted in the bottom end of the pin 81.

The pin 81 having been removed and the plate 120 having been cemented in place, the screw 61 is loosened and the member 50 rotated until the edge 160 can make contact on the top face of the plate 120 over the entire length of the latter. The screw 61 is tightened; and the pin 81 is replaced. The carriage 79 is moved by the screw 80 until the scribing point 82 can be brought to the position of the first line 78 to be scribed and the point 82 allowed to rest on the plate 120. The point 82 is drawn across the plate, conveniently perhaps by means of a lever 83 rigidly connected to the link 53. The link 157 is lifted, the carriage moved the prescribed distance, and the second line of the series of lines 78 scribed. Thus the successive lines of the grating are scribed and are accurately parallel to each other since each line must lie in a plane perpendicular to the axis of the shaft 52.

In Fig. 6 there is presented a fourth embodiment of the invention in which again use is made both of the fact that the outer edge of the secondary link of a folding door linkage remains always parallel to itself and of the fact that any point of or any point attached to the secondary link is confined to a fixed plane perpendicular to the fixed axis of the primary link and has two degrees of freedom of motion within that plane.

In this arrangement, a preferably circular drafting board 84 is rigidly secured to a columnar pedestal 85 which in turn is adjustably tiltable, in a vertical plane, in a base 86. The board 84 has its plane upper surface perpendicular to the axis of the column 85, and tilts with the column, always remaining perpendicular thereto. At a convenient distance below the board a supporting collar 87 is fastened on the column with the plane of the annular top face of the collar perpendicular to the column and parallel to the top of the board. On the collar 87 rests a rotatable collar 88 having diametrically opposite horizontally outstanding arms 89, 89 integral therewith. Vertical links 90, 90 are pivotable on the outer ends of the arms 89, 89 about a common axis perpendicular to the axis of the column 85. The two links 90, 90 are rigidly connected at their upper ends by a shaft 91 rigidly secured to each link. The shaft 91 lies above the top surface of the board 84 and is made to be accurately parallel to the axis on which the links 90, 90 pivot on the arms 89, 89. Hence the shaft 91 is also parallel to the top surface of the board 84 no matter how the collar 88 may be rotated on the column 85 and collar 87, and no matter how the links 90, 90 may be tilted on the arms 89, 89, the connections between the members 90, 91 and 90 and these members themselves being made sufficiently rigid to prevent any distortion of the primary folding door linkage formed by them.

The secondary link is a skeleton plate 92 journalled on the shaft 91 to be rotatable but not slidable thereon. The extreme end of this link or plate 92 is formed as a drafting straight edge 260 parallel to the axis of the shaft 91. This edge 260 may then be moved at will to and fro across the drafting surface, forwardly and backwardly, always remaining accurately parallel to itself. If it be desired to alter the orientation of the edge 260 on the board, the collar 88 is released from the locking toggle 93 by lifting the weight 94 and turning the collar 88 on the collar 87 until the desired position is reached. Releasing the weight 94 then locks the primary link 90, 91, 90 and the edge 260 in their new angularly adjusted positions.

If a slot 95 be made in the upper face of the link 92 near and parallel to the edge 260, and a carriage 96 be arranged to slide in the slot and have an arm with a hole 97 therein overhanging the edge 260, then a pencil point or the like held in the hole will trace a line accurately at right angles to the edge 260, thus obviating the need for the customary draftsman's right-angled triangle to trace a line perpendicular to a given direction. By inscribing around the circumference of the board a suitably divided scale, the board and straight edge become a protractor of unusual delicacy and accuracy because of the large radius thus available for the arcuate scale. It is not necessary that the board be circular. By suitably spacing the links 90, 90 a board of any peripheral shape may be employed. It will be understood that Fig. 6 is diagrammatical and drawn primarily to illustrate the invention. Hence the apparent flimsiness, especially of the constituent elements 90, 91, 90 of the primary link, which in practice will be proportioned, arranged and connected to have common torsional rigidity.

Other modifications and variations may well be made in the several things specifically disclosed to illustrate the invention without departing from the spirit and scope of the invention as described and pointed out in the appended claims.

For use in the claims hereinafter set forth, applicant defines the phrase "operative member" to include both a tool such as the diamond scribing point 82 in Fig. 5, which effects a visible and tangible result on the thing to which it is applied, and an element such as the straight edge 60 of Fig. 1 and 160 of Fig. 5 and 260 of Fig. 6, which prescribes or indicates a relation without effecting any physical modification. But the phrase "operative member" is to be restricted to such things as marking points, straight edges and the like and is not to be taken as including non-analogous members such as levers for example.

What is claimed is:

1. A device for controlling the motion of an operative member and comprising a base, a support pivotally adjustable on the base, a two-dimensionally extended rigid primary link mounted to be pivotable about an axis rigidly fixed with respect to the support and perpendicular to the direction of the axis of adjustment, a two-dimensionally extended rigid secondary link mounted on the primary link to be movable therewith and to be rotatable with respect thereto about an axis rigidly fixed with respect to the secondary link and parallel to the axis of the primary link on the support, and an operative member on the secondary link to have two degrees of freedom of motion therewith but with each point of the member confined to a plane perpendicular to the axis of the primary link on the support.

2. A device for controlling the motion of a straight edge and comprising a base, a support pivotally adjustable on the base, a two-dimensionally extended rigid primary link mounted to be pivotable about an axis rigidly fixed with respect to the support and perpendicular to the direction of the axis of adjustment, a two-dimensionally extended rigid secondary link mounted on the primary link to be movable therewith and to be rotatable with respect thereto about an axis rigidly fixed with respect to the secondary link and parallel to the axis of the primary link on the support, and a straight edge on the secondary link to have two degrees of freedom of motion therewith but with every position of the straight edge parallel to the axis of the primary link on the support.

ROBERT PASH.